United States Patent Office 3,530,131
Patented Sept. 22, 1970

3,530,131
BENZYL ETHERS
George de Stevens, Summit, N.J., assignor to Ciba Corporation, New York, N.Y., a corporation of Delaware
No Drawing. Filed Oct. 5, 1966, Ser. No. 584,345
The portion of the term of the patent subsequent to Feb. 2, 1982, has been disclaimed
Int. Cl. C07d 51/70
U.S. Cl. 260—268    4 Claims

ABSTRACT OF THE DISCLOSURE

α-(4-aralkylpiperazinoalkyl)-benzyl ethers, e.g. those of the formula:

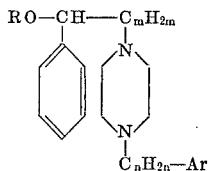

R=lower alkyl
Ar=phenyl or pyridyl
m,n=1-3
quaternaries and salts thereof are adrenolytic agents.

SUMMARY OF THE INVENTION

The present invention concerns and has for its object the provision of α-(4-aralkylpiperazinoalkyl)-benzyl ethers and methods for their preparation.

More particularly it relates to compounds having the Formula I:

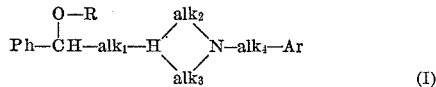

in which Ph stands for a phenyl radical, R for lower alkyl, each of $alk_1$ and $alk_4$ for lower alkylene separating the attached atoms by one to three carbon atoms, each of $alk_2$ and $alk_3$ for lower alkylene separating the nitrogen atoms by two carbon atoms, and Ar for an aromatic radical, quaternaries and salts thereof.

DESCRIPTION OF THE PREFERRED EMBODIMENTS

The phenyl radical Ph may be unsubstituted or substituted by one or more than one of the same or of different substituents attached to any of the positions available for substitution. Such substituents are, for example, lower alkyl, e.g. methyl, ethyl, n- or i-propyl, n-, i-, sec. or tert. butyl, etherified hydroxy or mercapto, such as lower alkoxy or alkylmercapto, e.g. methoxy, ethoxy, n- or i-propoxy or butoxy, methyl- or ethylmercapto or esterified hydroxy, such as halogeno, e.g. fluoro, chloro or bromo, trifluoromethyl, nitro, or amino, preferably tert. amino, such as di-lower alkylamino, e.g. dimethylamino or diethylamino. Preferred phenyl radicals Ph are phenyl, (lower alkyl)-phenyl (lower alkoxy)-phenyl, (lower alkylmercapto)-phenyl, (halogeno)-phenyl, (trifluoromethyl)-phenyl, (nitro)-phenyl and (di-lower alkylamino)-phenyl.

A lower alkyl group R is, for example, one of those mentioned above; it represents preferably ethyl. The lower alkylene radicals $alk_1$, $alk_2$ and $alk_3$, preferably stand for 1,2-ethylene, and $alk_4$ preferably for methylene, but they may also stand for 1,2-propylene, 1,2- or 2,3-butylene, 1,2- or 2,3-pentylene or 3,4-hexylene, and $alk_1$ and $alk_4$ also for 1,1-ethylene, 1,1-, 2,2- or 1,3-propylene, 1,1-, 2,2- or 1,3-butylene or 2,4-pentylene.

The aromatic radical Ar, more particularly is a monocyclic isocyclic or azacyclic aryl radical, which may be unsubstituted or substituted as shown for the phenyl radical Ph. It preferably stands for phenyl, (lower alkyl)-phenyl, (lower alkoxy)-phenyl, (lower alkylmercapto)-phenyl, (halogeno)-phenyl, (trifluoromethyl)-phenyl, (nitro)-phenyl, or (di-lower alkylamino)-phenyl, but especially for pyridyl or (lower alkyl)-pyridyl.

Quaternaries are preferably lower alkyl- or aralkyl-, e.g. benzyl-, 1- or 2-phenylethyl-quaternaries.

The compounds of this invention have valuable pharmacological properties. Apart from antiinflammatory activity, they show primarily adrenolytic effects, as can be demonstrated in animal tests using, for example, dogs or rats as test objects. They are, therefore, useful as antiadrenergic agents, for example, in the diagnosis and control of hypertension caused by phenochromocytoma and in the treatment of vascular diseases, e.g. vasopastic conditions. Furthermore, they can be used as intermediates in the preparation of other valuable products, especially of pharmacologically active compounds.

Particularly useful are compounds of the Formula I in which Ph stands for phenyl, (lower alkyl)-phenyl, (lower alkoxy)-phenyl or (halogeno)-phenyl, each of $alk_1$, $alk_2$ and $alk_3$ for 1,2-ethylene or 1,2-propylene, $alk_4$ for methylene, 1,1- or 1,2-ethylene, and Ar for pyridyl or (lower alkyl)-pyridyl, and acid addition salts thereof.

Especially valuable are compounds of the Formula II:

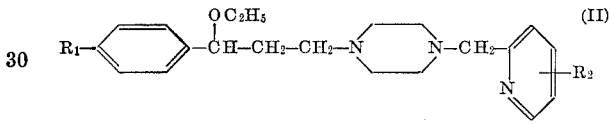

in which $R_1$ stands for hydrogen or chlorine and $R_2$ for hydrogen or methyl, and therapeutically acceptable acid addition salts thereof, which, when applied orally or intravenously to dogs in a dosage range of about to 5 mg./kg., show outstanding adrenolytic effects.

The compounds of this invention are prepared according to known methods. For example, the process for their preparation consists in:

(a) condensing an α-($R_3$-alkyl)-benzyl ether with an $R_4$-alkyl-aromatic compound in which one of $R_3$ and $R_4$ stands for reactively esterified hydroxy and the other for an N-unsubstituted piperazino radical, more particularly those of the formulae

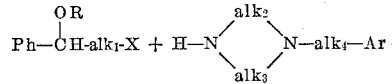

in which X stands for a reactively esterified hydroxy group, or (b) condensing an α-($R_5$-alkyl)-benzyl ether with an $R_6$-alkyl-aromatic compound in which one of $R_5$ and $R_6$ stands for primary amino and the other for reactively esterified bis(β-hydroxy-lower alkyl)-amino, more particularly those of the formulae

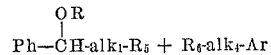

or (c) condensing an α-(2-aralkylamino-lower alkylaminoalkyl)-benzyl ether with a reactively esterified α,β-lower alkylene glycol, more particularly those of the formulae:

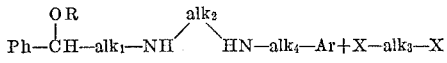

or (d) etherifying an α-(4 - aralkylpiperazinoalkyl)-benzyl alcohol or a reactive derivative thereof, with a lower alkanol or its reactive derivative, more particularly those of the formulae:

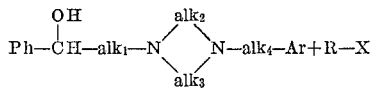

or (e) reducing an α - [4 - aralk(ano)yl-piperazino(oxo)alkyl]-benzyl ether, more particularly that of the formula:

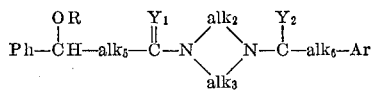

in which each of alk₅ and alk₆ stands for a direct bond or lower alkylene separating the attached atoms by at most 2 carbon atoms and one of $Y_1$ and $Y_2$ for oxo and the other for oxo or two hydrogens and, if desired, converting a resulting compound into another disclosed compound.

A reactive ester of the above-mentioned alcohols is, for example, that of a mineral or sulfonic acid, preferably that of a hydrohalic acid, e.g. hydrochloric or hydrobromic acid, sulfuric, methane-, ethane-, benzene- or p-toluenesulfonic acid. A reactive derivative of the lower alkanol R—OH may also be a diazo-lower alkane.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure. Condensing agents are especially used in the reaction with said reactive esters in order to eliminate the acid formed. They are basic agents, for example, alkali or alkaline earth metal carbonates or lower alkoxides, or organic nitrogen bases, such as pyridine or collidine, advantageously aliphatic tertiary amines, such as tri-lower alkylamines, e.g. triethylamine. In the etherification according to item (d) with diazo-alkanes, Lewis acids are advantageously used as catalysts, such as fluoboric acid, aluminum chloride or borontrifluoride etherate. The reduction according to item (e) is advantageously carried out with the use of complex light metal hydrides, such as lithium aluminum hydride or sodium borohydride, or by electrolytic reduction. Resulting compounds may be converted into each other according to known methods. For example, any nitro group present, e.g. within the radicals Ph or Ar, may be reduced to the amino group or any primary or secondary amino group substituted with the use of reactive esters of alcohols, preferably those of lower alkanols. Resulting tertiary bases may analogously be quaternized, for example, with the use of lower alkyl or aralkyl halides, e.g. chlorides, bromides or iodides.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4 - aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halogen-benzenesulfonic, toluenesulfonic, naphthalenesulfonic and sulfanilic acid; methionine, tryptophane, lysine and arginine.

These or other salts of the new compounds, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the amines or alcohols mentioned above may be used in the form of their alkali metal, e.g. sodium or potassium salts. Mainly, those starting materials should be used in the process of the invention that lead to the formation of those compounds indicated above as being specially valuable.

The starting material used is known or, if new, may be prepared according to known methods. For example, that used in reaction (a) is advantageously prepared by reaction of phenyl Grignard salts with a corresponding α-halo-alkyl ether, that used in reactions (b) and (c) analogous to reaction (a) i.e. condensation of reactive esters of corresponding alcohols with corresponding amines, that used in reaction (d) by reduction of corresponding ketones, for example, with complex light metal hydrides. Said ketones are easily obtainable according to the Mannich reaction or analogous to reaction (a). Finally, the starting material used in reaction (c) may be obtained analogous to reaction (a) from the corresponding acid halides.

The compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions, which are prepared by conventional methods, are also intended to be included within the scope of the present invention.

The following examples are intended to illustrate the invention. Temperatures are given in degrees centigrade, and all parts wherever given are parts by weight.

EXAMPLE 1

The mixture of 24.0 g. 3-ethoxy-3-phenyl-propyl chloride, 21.0 g. 1-(2-pyridylmethyl)-piperazine, 16.8 g. anhydrous sodium carbonate and 400 ml. anhydrous ethanol is refluxed for 72 hours while stirring. It is filtered, the residue washed with ethanol, the filtrate evaporated in vacuo and the residue heated to 130°/0.3 mm. Hg until none of the starting materials distills over. The residue is dissolved in the minimum amount of ethanol and the solution acidified with ethanolic hydrochloric acid. It is diluted with diethyl ether, the precipitate formed filtered off, washed with diethyl ether and recrystallized from ethanol-diethyl ether to yield the 1-(3-ethoxy-3-phenyl-propyl)-4-(2-pyridylmethyl) - piperazine dihydrochloride of the formula

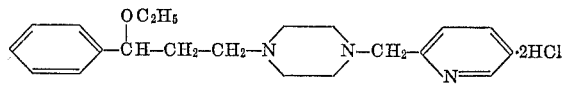

melting at 208°.

EXAMPLE 2

According to the method shown in Example 1, the 1-[3-(4-chlorophenyl)-propyl]-4-(2-pyridylmethyl) - piperazine dihydrachloride, M.P. 233–234° (ethanol) is prepared from equivalent amounts of the corresponding starting materials.

What is claimed is:

1. A compound having the formula:

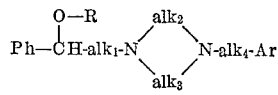

in which Ph stands for a member selected from the group consisting of phenyl, (lower alkyl)-phenyl, (lower alkoxy)-phenyl and (fluoro, chloro or bromo)-phenyl, each of $alk_1$, $alk_2$ and $alk_3$ for a member selected from the group consisting of 1,2-ethylene and 1,2-propylene, $alk_4$ for a member selected from the group consisting of methylene, 1,1-ethylene and 1,2-ethylene, R for lower alkyl and Ar for a member selected from the group consisting of pyridyl and (lower alkyl)-pyridyl or a therapeutically acceptable acid addition salt thereof.

2. A compound as claimed in claim 1 and having the formula:

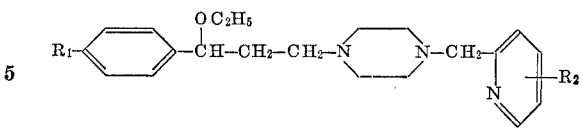

in which $R_1$ stands for a member selected from the group consisting of hydrogen and chlorine and $R_2$ for a member selected from the group consisting of hydrogen and methyl or a therapeutically acceptable acid addition salt thereof.

3. A compound as claimed in claim 1 and being a member selected from the group consisting of 1-(3-ethoxy-3-phenyl-propyl)-4-(2-pyridylmethyl) - piperazine and a therapeutically acceptable acid addition salt thereof.

4. A compound as claimed in claim 1 and being a member selected from the group consisting of 1-[3-ethoxy-3-(4-chlorophenyl)-propyl]-4-(2 - pyridylmethyl) - piperazine and a therapeutically acceptable acid addition salt thereof.

References Cited

UNITED STATES PATENTS 3,168,522   2/1965   De Stevens et al. _____ 260—268

FOREIGN PATENTS 970,130   9/1964   Great Britain.

ALEX MAZEL, Primary Examiner

A. M. T. TIGHE, Assistant Examiner

U.S. Cl. X.R.

260—611; 424—200, 232 250